(12) United States Patent
Morimoto

(10) Patent No.: US 6,240,327 B1
(45) Date of Patent: May 29, 2001

(54) AUDIO-MIXING APPARATUS AND AUDIO-MIXING PROCESSING METHOD

(75) Inventor: Kouichi Morimoto, Kanagawa (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 08/893,993

(22) Filed: Jul. 16, 1997

(30) Foreign Application Priority Data

Jul. 16, 1996 (JP) .................................................... 8-185833

(51) Int. Cl.⁷ .............................. G06F 17/00; H04B 1/00
(52) U.S. Cl. .............................................. 700/94; 381/119
(58) Field of Search .................................. 381/111, 63, 1, 381/106, 117; 364/400.01; 700/94

(56) References Cited

U.S. PATENT DOCUMENTS

| | | | |
|---|---|---|---|
| 4,550,425 | * 10/1985 | Anderson et al. | ............ 381/106 |
| 5,151,998 | 9/1992 | Capps . | |
| 5,764,775 | * 6/1998 | Kim | ................................ 381/1 |

FOREIGN PATENT DOCUMENTS

| | | |
|---|---|---|
| 0 310 456 A2 | 4/1989 | (EP) . |
| 0 462 799 A2 | 12/1991 | (EP) . |
| 0 743 640 A2 | 11/1996 | (EP) . |
| 1-98177 | 4/1989 | (JP) . |

* cited by examiner

Primary Examiner—Xu Mei
(74) Attorney, Agent, or Firm—Foley & Lardner

(57) ABSTRACT

An audio-mixing apparatus and processing method reduces the time for audio-mixing and the PCM conversion processes and reduces memory capacity. The audio-mixing apparatus has a memory for storing a mixing data piece generated from an operation data piece which precedes a different operation data piece being processed at present, a mixing processor for performing a mixing process of the different operation data piece and the mixing data piece read out of the memory to generate a different mixing data piece, and a PCM converter for sequentially performing a PCM conversion process of the mixing data pieces to deliver PCM output data piece.

15 Claims, 3 Drawing Sheets

AUDIO-MIXING APPARATUS AND AUDIO-MIXING PROCESSING METHOD

BACKGROUND OF THE INVENTION

The present invention relates to an audio-mixing apparatus and an audio-mixing processing method and more particularly, to audio-mixing apparatus and processing method for digital audio signals.

In recent years, with advancement of digital technologies, digitization of video and audio apparatus has been promoted and a mixing process in which digitized audio signals or digital audio signals as they are mixed has been widely employed even in editing of audio signals.

Conventionally, in a general method of performing the mixing process of this type of digital audio signal, pieces of serial audio data consecutively inputted from a plurality of channels are subjected to a predetermined operation process channel by channel, subjected to PCM conversion corresponding to each channel and subjected to the mixing process. Therefore, memories are provided by the same number as that of the channels and the serial audio data pieces are stored in individual channel data regions. The thus stored individual audio data pieces are subjected to the mixing process by means of a mixing processor and delivered as PCM output data pieces.

Referring to FIG. 4 showing a conventional audio-mixing apparatus in block form, the audio-mixing apparatus has an operation processor 1 for performing, channel by channel, an inverse Fast Fourier transform (FFT) process of serial input data pieces DIi representing digital audio data pieces corresponding to a plurality of channels and a PCM converter 40 for performing a PCM conversion process each in correspondence to operation data pieces PDi of respective channels and delivering PCM conversion data pieces DCi. There is further provided a plurality of memories 30 for storing the individual PCM conversion data pieces DCi of the respective channels, and a mixing processor 20 for performing a mixing process of the PCM conversion data pieces MCi of the respective channels read out of the memories 30 and generating PCM output data pieces DOi.

The operation of the conventional audio-mixing apparatus will be described with reference to FIG. 4. The operation processor 1 is supplied with serial input data pieces DIi of a plurality of channels via an input terminal TI, performs an operation process such as an inverse FFT process channel by channel to generate operation data pieces PDi corresponding to the respective channels and applies the operation data pieces PDi to the PCM converter 40.

In the PCM converter 40, a PCM conversion process corresponding to each channel is carried out in response to the supply of each of the operation data pieces PDi to deliver, channel by channel, PCM conversion data pieces DCi which in turn are supplied to the respective memories 30. Each of the PCM conversion data DCi supplied to each memory 30 is temporarily stored therein for preparation for the mixing process.

The mixing processor 20 reads PCM conversion data pieces MCi of the respective channels out of the respective memories 30, performs the mixing processing of the read-out PCM conversion data pieces and generates consecutive PCM output data pieces DOi of the respective channels which in turn are delivered via an output terminal TO. At that time, the mixing processor 20 does not operate before all of the memories 30 have completed storage of the PCM conversion data pieces DCi which are obtained by subjecting all of the serial input data pieces DIi of the plurality of channels to the operation process and subjecting the operated input data pieces to the PCM conversion.

According to the aforementioned conventional audio-mixing apparatus and processing method, in the mixing process of digital audio signals of the plurality of channels, the data pieces of the respective channels are separately subjected to the PCM process and PCM output data pieces are generated by combining necessary signal data pieces and mixing them. Therefore, the mixing process is carried out after completion of operation execution for all channels and completion of storage of operation data pieces regardless of whether or not the mixing process for all of the plurality of channels is necessary, leading to disadvantages that as the number of channels increases, the operation time increases and the capacity of memories for operation data storage increases.

SUMMARY OF THE INVENTION

The present invention contemplates the elimination of the above disadvantages and it is an object of the present invention to provide audio-mixing apparatus and processing method which can decrease the necessary memory capacity and can decrease the operation time.

To accomplish the above object, according to the present invention, in an audio-mixing apparatus having operation processing means for sequentially receiving digital audio data pieces corresponding to first and second channels and performing a predetermined operation process of the digital audio data pieces in respect of each of the first and second channels to sequentially deliver corresponding first and second operation data pieces which in turn undergo a mixing process, the apparatus comprises:

memory means for storing a first mixing data piece generated from the first operation data piece which precedes the second operation data piece being processed at present;

mixing processing means for performing a mixing operation process of the second operation data piece and the first mixing data piece read out of the memory means to generate a second mixing data piece; and PCM conversion means for sequentially performing a PCM conversion process of the first and second mixing data pieces to deliver PCM output data pieces.

According to the present invention, in an audio-mixing processing method for performing a mixing process of digital audio data pieces sequentially supplied and corresponding to first and second channels, the method comprises the steps of:

performing a predetermined operation process in respect of each of the first and second channels and sequentially delivering first and second operation data pieces;

storing a first mixing data piece generated from the first operation data piece which precedes the second operation data piece being processed at present;

performing a mixing process of the second operation data piece and the read-out first mixing data piece to generate a second mixing data piece; and sequentially performing a PCM conversion process of the first and second mixing data pieces to deliver PCM output data pieces.

DESCRIPTION OF THE PREFERRED EMBODIMENTS

Figure 1:
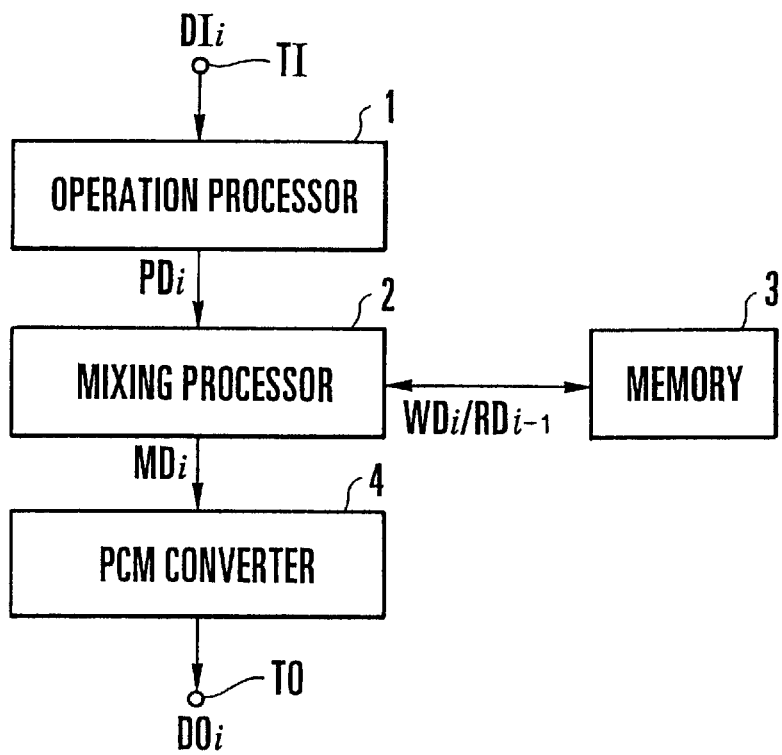
FIG. 1 is a block diagram showing an embodiment of an audio-mixing apparatus according to the present invention.
Figure 4:
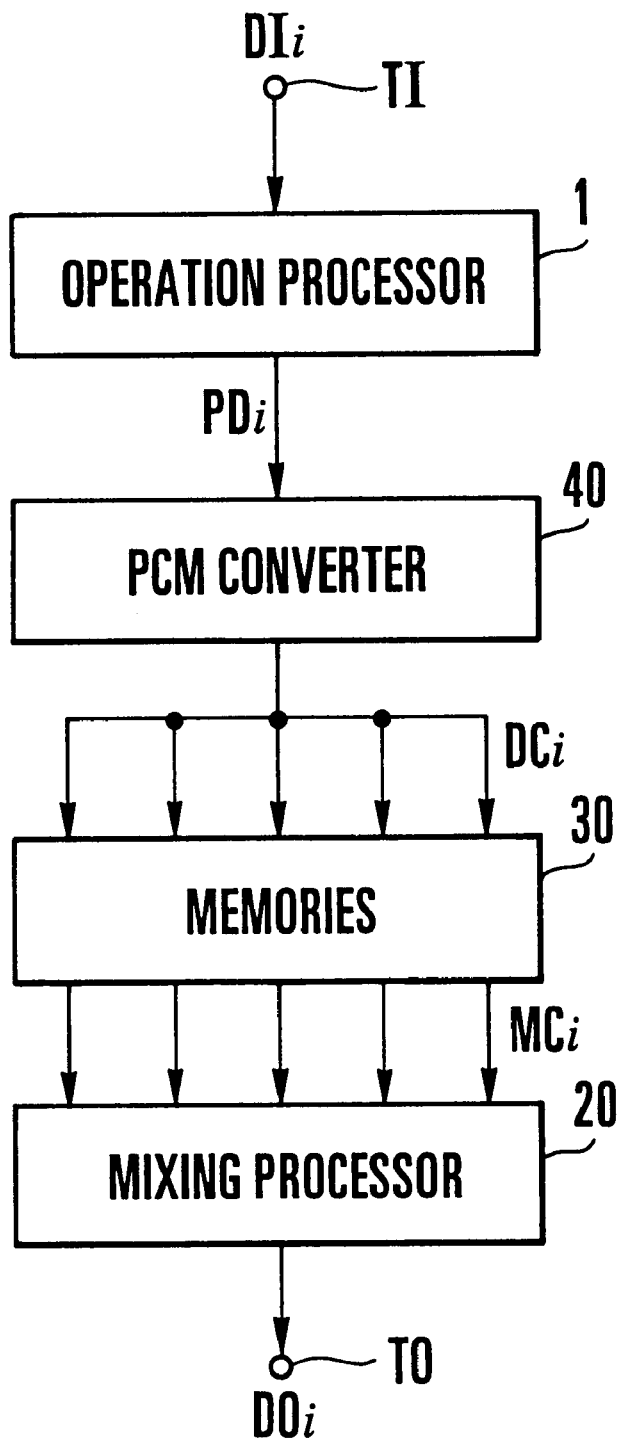
FIG. 4 is a block diagram showing an example of a conventional audio-mixing apparatus.

Referring now to FIG. 1, an embodiment of an audio-mixing apparatus according to the present invention will be described. In FIG. 1, components similar to those in FIG. 4 are designated by identical reference numeral or signs. The audio-mixing apparatus shown in FIG. 1 comprises, in addition to the conventional operation processor 1 for performing the operation process of serial input data pieces DIi corresponding to a plurality of channels to deliver operation data pieces PDi of the corresponding respective channels, a mixing processor 2 for performing a mixing process of the operation data pieces PDi to generate mixing data pieces MDi and data pieces WDi to be stored in a memory 3, and a PCM converter 4 for performing a PCM conversion process of the mixing data pieces MDi to deliver PCM output data pieces DOi.

Figure 2:
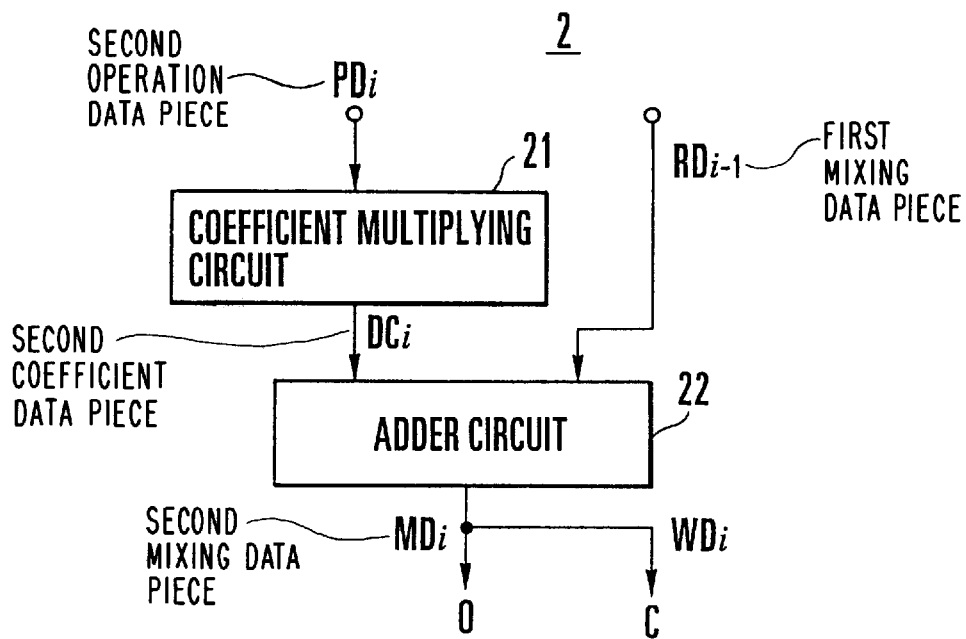
FIG. 2 is a block diagram showing the construction of a mixing processor in FIG. 1.

Referring to FIG. 2 showing the construction of the mixing processor in block form, the mixing processor 2 includes a coefficient multiplying circuit 21 for multiplying the input operation data pieces PDi by predetermined coefficients to generate coefficient operation data pieces DCi and an adder circuit 22 for adding the coefficient operation data pieces DCi and read-out data pieces RDi from the memory 3 to generate mixing data pieces MDi/memory write data piece WDi.

Figure 3:
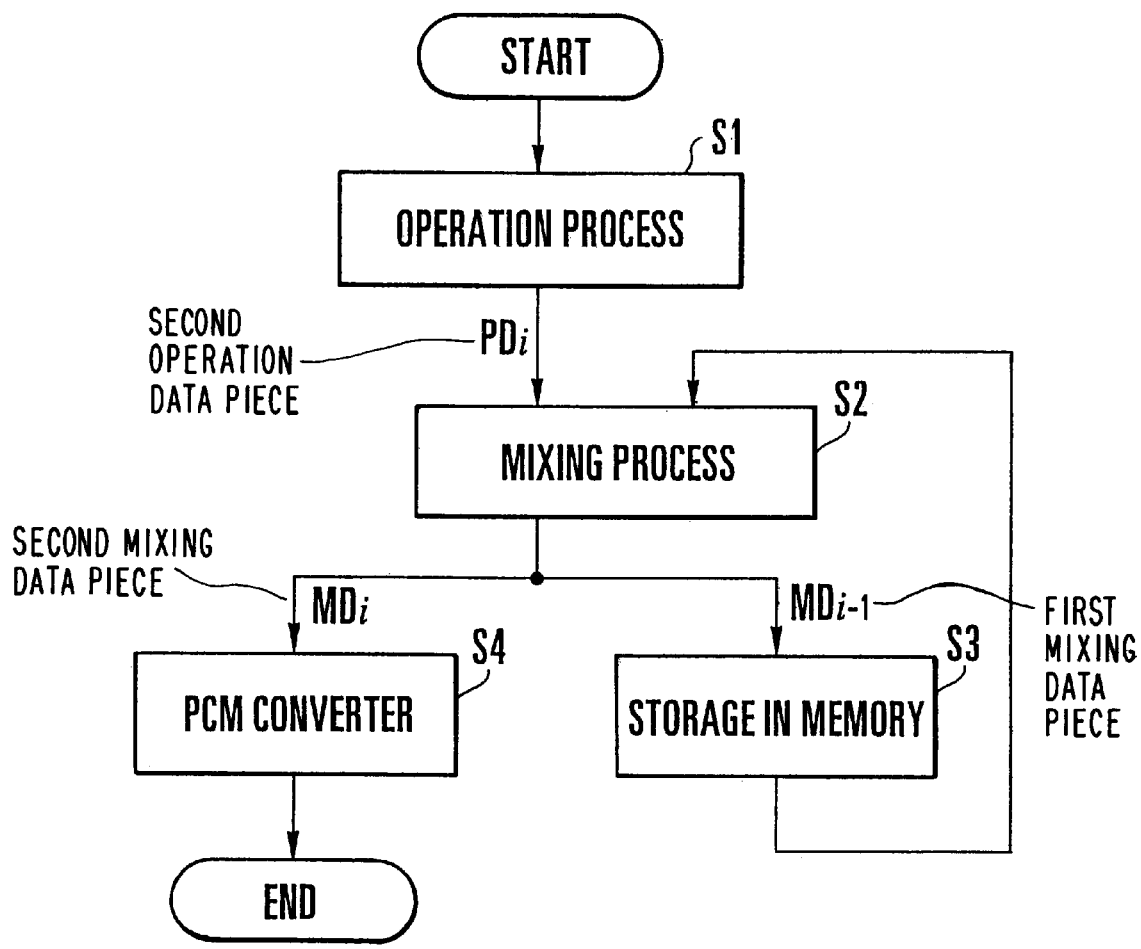
FIG. 3 is a flow chart showing an example of a processing method in the embodiment of the present invention.

Referring to FIGS. 1 and 2 and FIG. 3 showing a flow chart of a processing method in the present embodiment, the operation of the present embodiment will be described. Like the conventional operation processor 1, the operation processor 1 of the present embodiment receives serial input data pieces DIi of a plurality of channels via an input terminal TI, performs an operation process such as an inverse Fast Fourier transform (FFT) process channel by channel to sequentially generate operation data pieces PDi of the corresponding respective channels, and supplies the operation data pieces to the mixing processor 2 (step S1).

In the mixing processor 2, the coefficient multiplying circuit 21 responds to the supply of the operation data pieces PDi to first multiply an operation data piece PD1 corresponding to the initial channel 1 by a coefficient to generate a corresponding coefficient operation data piece DC1 and supplies the coefficient operation data piece DC1 to the adder circuit 22. The adder circuit 22 adds the coefficient operation data piece DC1 and a read-out data piece RD0 of storage data corresponding to the previous channel (step S2). However, since the data piece DC1 undergoing addition at present is the data piece corresponding to the initial channel 1 as described above, no data has been stored in the memory 3 and this read-out data piece RD0 is 0 (zero). Accordingly, the adder 22 adds the coefficient operation data DC1 corresponding to the initial channel and 0 to generate a corresponding output mixing data piece MD1 (=DC1) and supplies the data piece MD1 to the PCM converter 4 and to the memory 3 as a write data piece WD1 (step S3).

Similarly, the coefficient multiplying circuit 21 multiplies an operation data piece PD2 corresponding to the next channel 2 by a different coefficient to generate a corresponding coefficient operation data piece DC2 and supplies it to the adder circuit 22. The adder circuit 22 adds the data piece DC2 and a read-out data piece RD1 equivalent to the write data piece WD1 corresponding to the previous channel 1 to generate a corresponding mixing data piece MD2 (=DC2+DC1) (step S2) and supplies the mixing data piece MD2 to the PCM converter 4 and to the memory 3 as a write data piece WD2.

The coefficient multiplying circuit 21 performs a similar process for the next channel 3 and after a mixing process for the final channel n ends, supplies a mixing data piece MDn representative of a result of addition by the adder circuit 22 to the PCM converter 4. The PCM converter 4 performs a PCM conversion of the mixing data piece MDn (step S4) and delivers PCM output data pieces DOi through an output terminal TO.

As described above, according to the present invention, the mixing processor 2 performs predetermined coefficient multiplication corresponding to the present channel being inputted at present before the PCM conversion so as to generate a coefficient operation data piece DC2 and at the same time, reads a mixing data piece RD1 corresponding to the previous channel and stored in the memory 3 and adds the two data pieces DC2 and RD1 of the present and previous channels to generate a mixing data piece MD2. The mixing process for the necessary channels is sequentially carried out by repeating the above process to generate mixing data pieces MDi for the respective channels. The mixing data pieces are subjected to the PCM conversion to generate PCM output data piece which are ultimate mixing-processed PCM outputs. The operation and PCM conversion which are conventionally carried out at a frequency equal to the number of all channels is not needed and besides, storage of the amount of data corresponding to one channel in the memory 3 suffices to reduce the memory capacity to a necessary lowermost value.

As described above, in the audio-mixing apparatus and processing method of the present invention, there are provided memory means for storing a first mixing data piece generated from a first operation data piece which precedes a second operation data piece being processed at present, mixing processing means for performing a mixing operation process of the second operation data piece and the first mixing data piece read out of the memory means to generate a second mixing data piece, and PCM conversion means for performing sequential PCM conversion processes of the first and second mixing data pieces to deliver PCM output data pieces, whereby the process is repeated in which a coefficient operation data piece, generated by performing coefficient multiplication corresponding to a mixing process of the present channel immediately before PCM conversion, is added with a mixing data piece corresponding to the previous channel and stored in the memory to generate a mixing data piece corresponding to the present channel, so as to sequentially generate mixing data pieces by a number equal to the number of necessary channels, and the mixing data pieces for the respective channels are sequentially subjected to the PCM conversion, thereby attaining an advantage that the memory capacity can be reduced to a necessary lowermost value which is equivalent to nearly one channel.

Further, the mixing data piece corresponding to the present channel is generated using only the mixing data piece corresponding to the previous channel and therefore, the operation process time can advantageously be reduced by a difference between the number of input channels and the number of output channels as compared to the conventional process in which the mixing data pieces are generated after the operation process for all channels ends.

What is claimed is:

1. An audio-mixing apparatus having operation processing means for sequentially receiving digital audio data pieces corresponding to first and second channels and performing a predetermined process of the digital audio data pieces in respect of each of the first and second channels to sequentially deliver corresponding first and second operation data pieces which in turn undergo a mixing process, comprising:

- memory means for storing a first mixing data piece generated from the first operation data piece which precedes the second operation data piece being processed at present;
- mixing processing means for performing a mixing operation process of said second operation data piece and said first mixing data piece read out of said memory means to generate a second mixing data piece; and
- PCM conversion means for sequentially performing a PCM conversion process of said first and second mixing data pieces to deliver PCM output data pieces.

2. An audio-mixing apparatus according to claim 1, wherein said mixing processing means includes:

- a coefficient multiplying circuit for multiplying said first and second operation data pieces by a predetermined coefficient to generate first and second coefficient multiplication data pieces; and
- an adder circuit for adding said second coefficient multiplication data piece and said first mixing data piece to generate said second mixing data piece.

3. An audio-mixing processing method for performing a mixing process of digital audio data pieces sequentially supplied and corresponding to first and second channels, comprising the steps of:

- performing a predetermined operation process in respect of each of said first and second channels and sequentially delivering first and second operation data pieces;
- storing a first mixing data piece generated from said first operation data piece which precedes said second operation data piece being processed at present;
- performing a mixing process of said second operation data piece and said stored first mixing data piece to generate a second mixing data piece; and
- sequentially performing a PCM conversion process of said first and second mixing data pieces to deliver PCM output data pieces.

4. An audio-mixing apparatus, comprising:

- an operation processor receiving a first digital audio data and a second digital audio data following said first digital audio data, and performing a predetermined process of each of said first and second digital data to produce first and second operation data respectively;
- a memory storing a first mixing data derived from the first operation data;
- a mixing processor performing a mixing operation process of said second operation data and said first mixing data read out from said memory to generate a second mixing data; and
- a PCM converter sequentially performing a PCM conversion process of said first and second mixing data and outputting a PCM-converted output data.

5. An audio-mixing apparatus according to claim 4, wherein the mixing processor includes:

- a coefficient multiplying circuit for multiplying said second operation data by a predetermined coefficient to generate a coefficient multiplication data; and
- an adder circuit for adding said coefficient multiplication data and said first mixing data to generate said second mixing data.

6. An audio-mixing apparatus according to claim 5, wherein the first mixing data is replaced in memory by the second mixing data.

7. An audio-mixing apparatus according to claim 4, wherein the operation processor receives a plurality of digital audio data in series including the first through N-th digital audio data and produces a plurality of corresponding operation data in series including the first through N-th operation data, where N is any integer greater than 1.

8. An audio-mixing apparatus according to claim 7, wherein the first digital audio data comprises the digital audio data that is first in the series of the plurality of digital audio data.

9. An audio-mixing apparatus according to claim 8, wherein the first mixing data is generated by multiplying said first operation data by a first coefficient.

10. An audio-mixing apparatus according to claim 9, wherein the mixing processor includes:

- a coefficient multiplying circuit for multiplying an i-th operation data by an i-th coefficient to generate an i-th coefficient multiplication data; and
- an adder circuit for adding said i-th coefficient multiplication data and an (i−1)-th mixing data to generate an i-th mixing data,
- wherein the (i−1)-th mixing data is read from said memory and i is any integer from 2 through N.

11. An audio-mixing apparatus according to claim 10, wherein the i-th mixing data generated by the mixing processor replaces the (i−1)-th mixing data stored in said memory.

12. An audio-mixing apparatus according to claim 11, wherein the i-th mixing data is based on each of the first through i-th digital audio data but is not based on any of the (i+1)-th through N-th digital audio data.

13. An audio-mixing method comprising the steps of:

- storing an (i−1)-th mixing data in a memory;
- generating an i-th operation data based on an i-th digital audio data;
- multiplying the i-th operation data by an i-th coefficient to generate an i-th multiplication data;
- reading out the (i−1)-th mixing data from said memory;
- adding the i-th multiplication data to the (i−1)-th mixing data to generate an i-th mixing data;
- replacing the (i−1)-th mixing data with the i-th mixing data in said memory; and
- performing a PCM conversion process on the i-th mixing data to produce an i-th PCM-converted output data,
- wherein i is any integer from 2 through N and N is any integer greater than 1.

14. An audio-mixing method according to claim 13, wherein a first of the N mixing data is based on a first of N digital audio data but not on second through N-th digital audio data.

15. An audio-mixing method according to claim 14, wherein the i-th of the N mixing data is based on the first through i-th digital audio data and the first through i-th coefficients.

* * * * *